US 12,224,460 B2

(12) United States Patent
Takahashi et al.

(10) Patent No.: US 12,224,460 B2
(45) Date of Patent: Feb. 11, 2025

(54) COIN-SHAPED CELL

(71) Applicant: PANASONIC CORPORATION, Kadoma (JP)

(72) Inventors: Tadayoshi Takahashi, Kadoma (JP); Tomohiro Kiko, Kadoma (JP); Rina Nakamura, Ageo (JP); Shuichi Ohtsubo, Ageo (JP); Kazuyuki Ohdate, Ageo (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 445 days.

(21) Appl. No.: 17/641,893

(22) PCT Filed: Sep. 4, 2020

(86) PCT No.: PCT/JP2020/033602
§ 371 (c)(1),
(2) Date: Mar. 10, 2022

(87) PCT Pub. No.: WO2021/059927
PCT Pub. Date: Apr. 1, 2021

(65) Prior Publication Data
US 2022/0336934 A1 Oct. 20, 2022

(30) Foreign Application Priority Data

Sep. 27, 2019 (JP) .................. 2019-176424

(51) Int. Cl.
H01M 50/578 (2021.01)
H01B 1/20 (2006.01)
(Continued)

(52) U.S. Cl.
CPC ....... H01M 50/578 (2021.01); H01M 50/109 (2021.01); H01M 50/147 (2021.01);
(Continued)

(58) Field of Classification Search
CPC .................................................. H01M 50/109
See application file for complete search history.

(56) References Cited

U.S. PATENT DOCUMENTS 9,741,975 B2 8/2017 Laulicht et al.
2005/0255376 A1* 11/2005 Cho .................... H01M 50/578
429/61
(Continued)

FOREIGN PATENT DOCUMENTS

JP 59-49109 A 3/1984
JP 2007-533100 A 11/2007
(Continued)

OTHER PUBLICATIONS

International Search Report of PCT/JP2020/033602 dated Nov. 17, 2020 [PCT/ISA/210].

Primary Examiner — Jonathan Crepeau
(74) Attorney, Agent, or Firm — Sughrue Mion, PLLC

(57) ABSTRACT

A coin-shaped cell containing a battery cell case having a bottom plate and side portion; a sealing plate; a gasket compressed and interposed between the side and a rim portion; power generation elements sealed by the case, the sealing plate, and the gasket; and a pressure-sensitive conductive film disposed on an outer surface of one of the case and the sealing plate. The pressure-sensitive conductive film includes a first elastomer layer that holds conductive particles, and a second elastomer layer which is disposed on at least one surface of the first elastomer layer and is in contact with at least a part of the conductive particles. An average particle diameter of the conductive particles is equal to or larger than a thickness of an elastomer part of the first elastomer layer, and the conductive particles are disposed in a single layer in a planar direction of the first elastomer layer.

4 Claims, 7 Drawing Sheets

(51) Int. Cl.
*H01B 5/16* (2006.01)
*H01M 50/109* (2021.01)
*H01M 50/147* (2021.01)
*H01M 50/186* (2021.01)
*H01M 50/574* (2021.01)

(52) U.S. Cl.
CPC ....... *H01M 50/186* (2021.01); *H01M 50/574* (2021.01); *H01B 1/20* (2013.01); *H01B 5/16* (2013.01)

(56) References Cited

U.S. PATENT DOCUMENTS

| | | |
|---|---|---|
| 2016/0020436 A1 | 1/2016 | Laulicht et al. |
| 2018/0159092 A1 | 6/2018 | Barenberg et al. |

FOREIGN PATENT DOCUMENTS

| | | | |
|---|---|---|---|
| JP | 2021057114 | * | 4/2021 |
| KR | 20060036165 | * | 4/2006 |
| WO | 2016/179504 A1 | | 11/2016 |
| WO | 2018/084075 A1 | | 5/2018 |

* cited by examiner

{FIG. 1}
(Prior Art)
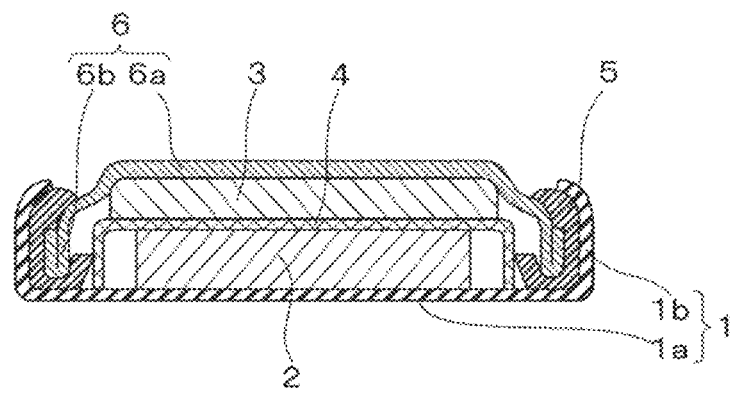
{FIG. 2}
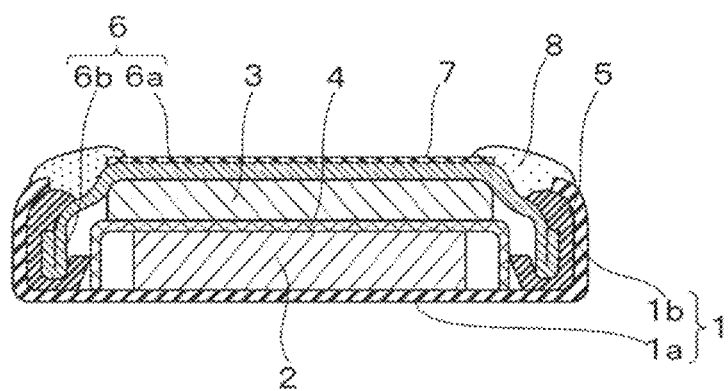

{FIG. 3}
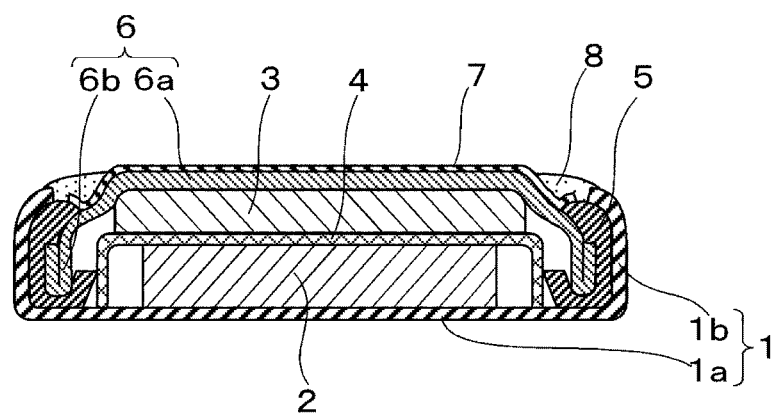
{FIG. 4}
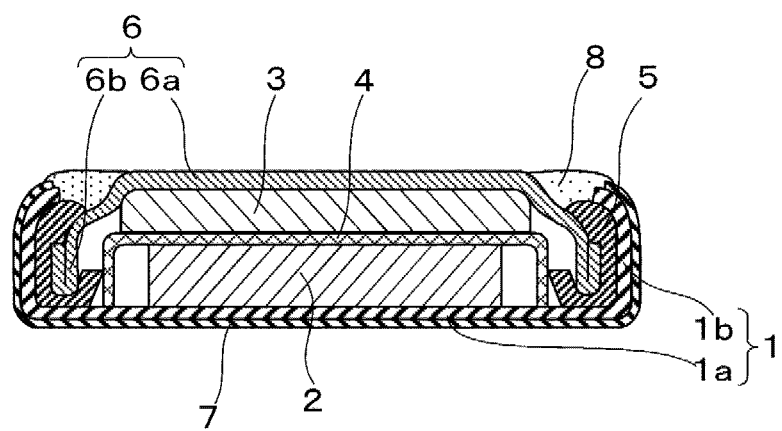

{FIG. 5}
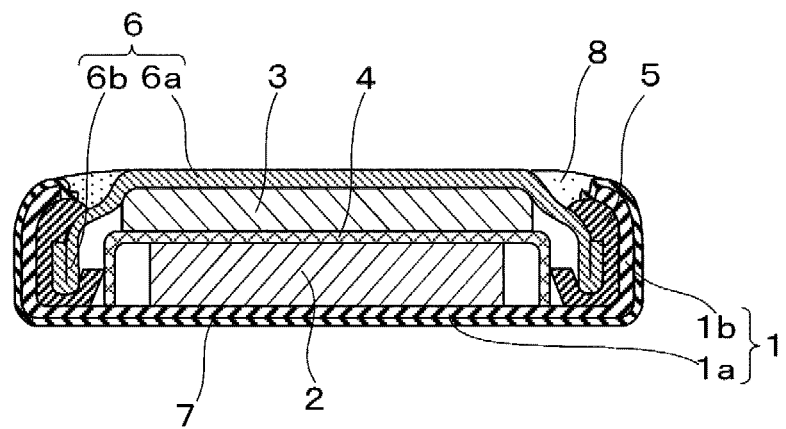
{FIG. 6}
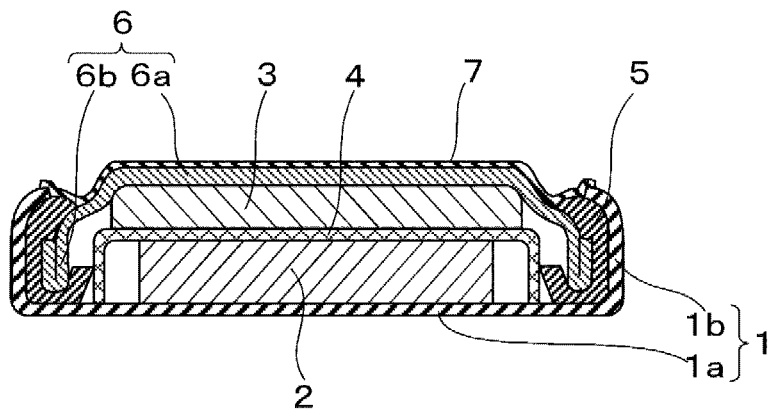

{FIG. 7}
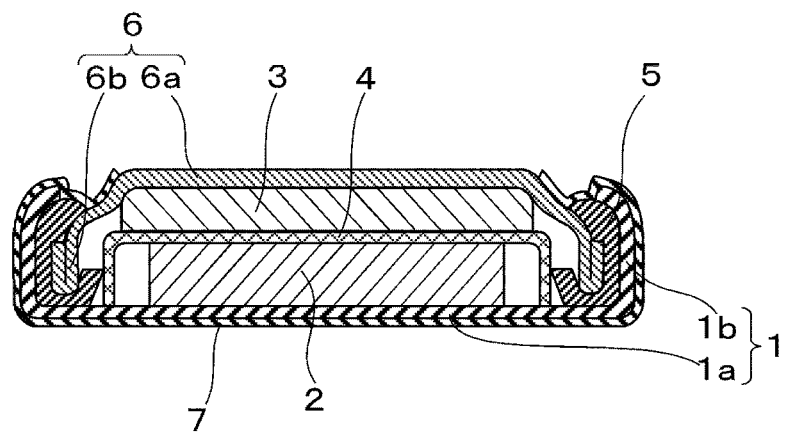
{FIG. 8}
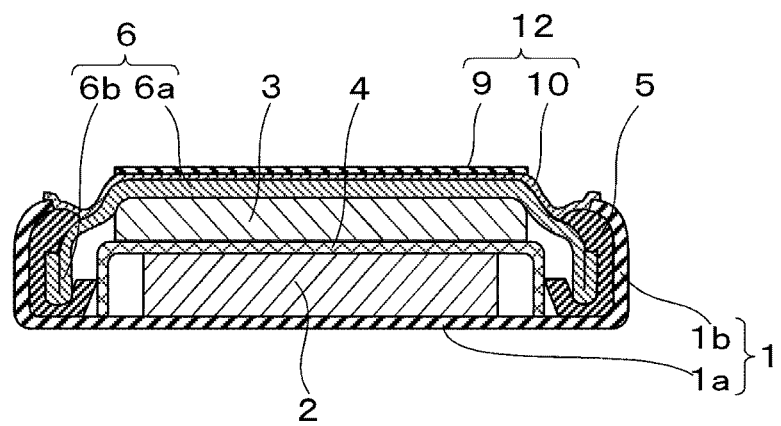

{FIG. 9}
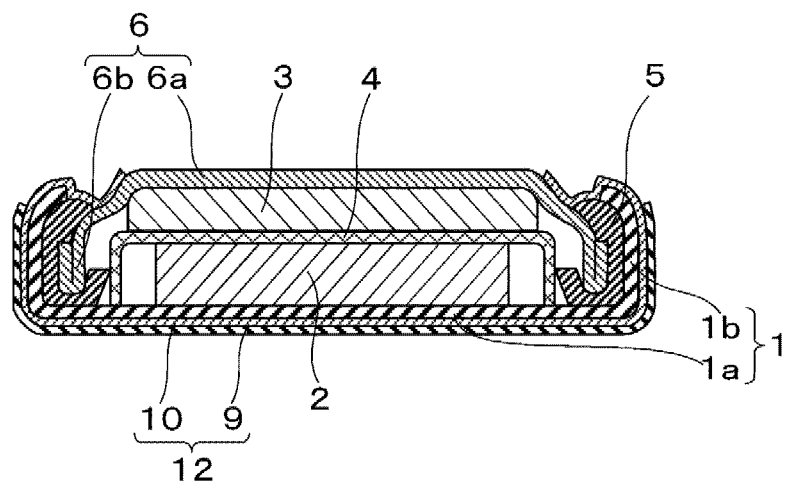
{FIG. 10}
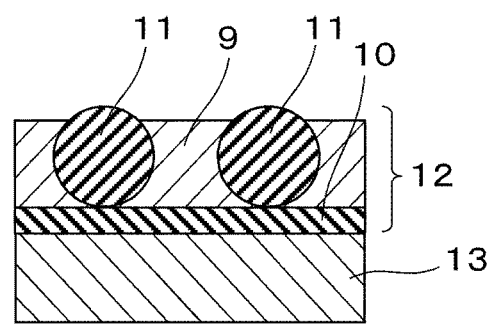

{FIG. 11}
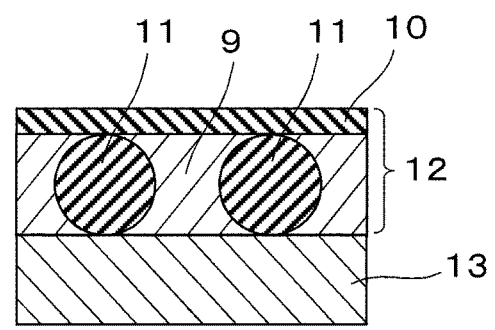
{FIG. 12}
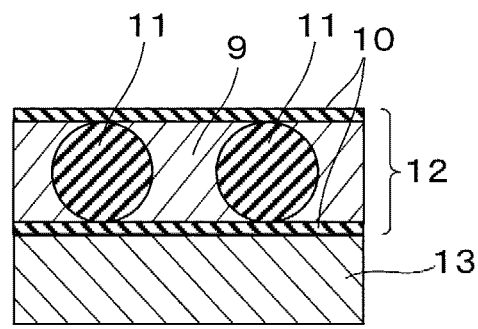

{FIG. 13}
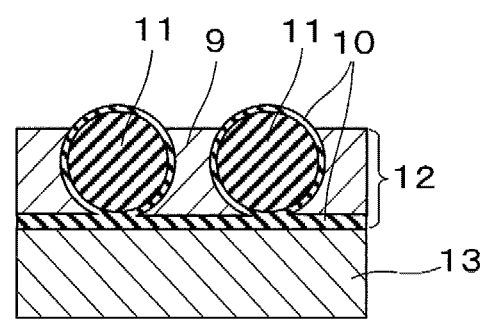

COIN-SHAPED CELL

CROSS REFERENCE TO RELATED APPLICATIONS

This application is a National Stage of International Application No. PCT/JP2020/033602, filed Sep. 4, 2020, claiming priority to Japanese Patent Application No. 2019-176424, filed Sep. 27, 2019, the contents of all of which are incorporated herein by reference in their entirety.

FIELD OF THE INVENTION

The present invention relates to a coin-shaped cell (battery), and more specifically to a coin-shaped cell having a high safety from accidental ingestion or swallow.

BACKGROUND OF THE INVENTION

Coin-shaped cells are widely used as power sources for small apparatuses or backup memories. In the common coin-shaped cell, pellet-shaped positive electrode and negative electrode, a separator interposed between the electrodes, and power generation elements containing an electrolytic solution are housed in an exterior body constituted of a battery cell case, a sealing plate, and a gasket. From this state, sealing of the battery cell case opening is performed by caulking a rim portion of the sealing plate via the gasket.

Along with the expansion of coin-shaped cell applications, the number of accidental ingestion cases has increased, so that the importance of countermeasures against accidental coin-shaped cell ingestion has increased. When a coin-shaped cell is taken into a living body, the terminal surfaces of the battery cell case and the sealing plate come in contact with bodily fluid, resulting in short-circuiting of the positive electrode and the negative electrode. Due to the short-circuit, a current involving electrolysis of water flows, and the bodily fluid on the negative electrode terminal side becomes alkaline. The alkaline bodily fluid damages biological tissue, such as the esophageal wall.

A countermeasure technique against accidental coin-shaped cell ingestion is described in Patent Literature 1. The technique uses a film of a pressure-sensitive quantum tunneling composite coating (QTCC) dispersed of conductive microparticles having nanoscale roughness on the particle surfaces in a polymer matrix like silicone elastomer. Application of threshold or greater pressure to the pressure-sensitive coating film shortens distance between the conductive microparticles, and the conductive microparticles are placed in conductive state by quantum tunneling effect. Conversely, when lower than threshold pressure is applied, the conductive microparticles remain apart from one another, so that no quantum tunneling effect occurs and electrical insulation state is maintained. Patent Literature 1 teaches that at least one between the positive terminal and the negative terminal of the coin-shaped cell is covered with the pressure-sensitive coating film to set pressure-sensitive conductivity threshold to larger than pressure received inside the human alimentary canal. This enables prevention of short-circuiting of an accidentally ingested coin-shaped cell in the alimentary canal.

CITATION LIST

Patent Literatures

Patent Literature 1: U.S. Pat. No. 9,741,975

SUMMARY OF THE INVENTION

Technical Problem

In the above-described pressure-sensitive coating film described in Patent Literature 1, the conductive particles having nanoscale roughness at the particle surfaces are substantially uniformly dispersed from one another in the polymer matrix. In a case of current flows through the pressure-sensitive coating film by applying pressure, distance between the conductive particles needs to be shortened in the current flow direction up to the point that quantum tunneling effect is developed, but responsiveness to applied pressure is limited. In other word, the battery performance in coin-shaped battery requested of low resistance fundamentally can not be obtained sufficiently due to high resistance in current flows in case that even if the pressure for current flows is greater than the threshold, the pressure is near the threshold. Additionally, even when sufficient pressure is applied, current concentrates on the contact parts of the conductive particles having the rough surfaces during current flow. This concentration of current locally generates heat that degrades the polymer matrix and the conductive particles themselves, resulting in an increase in cell resistance.

The subject of the present invention is to provide a coin-shaped cell having excellent safety against accidental ingestion and pressure-sensitive conductive function that is a capability of quick response of low resistance current flows situation under applied pressure equal to or more than pressure-sensitive conductivity threshold, minimizing extreme current concentration and the cell resistance variation by the applied pressure in current flows situation, and exhibiting desired pressure-sensitive conductive property even in repeated use

Solution to Problem

The above-described problems of the present invention have been solved by the following means.

[1]
A coin-shaped cell, containing:
  a battery cell case having a bottom plate and a side portion rising from a rim of the bottom plate;
  a sealing plate having a top plate and a rim portion extending from the top plate to the inside of the side portion;
  a gasket compressed and interposed between the side portion and the rim portion;
  power generation elements sealed by the battery cell case, the sealing plate, and the gasket; and
  a pressure-sensitive conductive film disposed on an outer surface of at least one of the battery cell case and the sealing plate;
  wherein the pressure-sensitive conductive film includes:
    a first elastomer layer that holds conductive particles, and
    a second elastomer layer which is disposed on at least one surface of the first elastomer layer and is in contact with at least a part of the conductive particles among the conductive particles held to the first elastomer layer, and wherein an average particle diameter of the conductive particles is equal to or larger than a thickness of an elastomer part of the first elastomer layer, and the conductive particles are disposed in a single layer in a planar direction of the first elastomer layer.

[2]

The coin-shaped cell described in [1], wherein the average particle diameter of the conductive particles is larger than the thickness of the elastomer part of the first elastomer layer.

[3]

The coin-shaped cell described in [1] or [2], wherein the second elastomer layer is disposed on an outer surface of at least one of the battery cell case and the sealing plate.

[4]

The coin-shaped cell described in any one of [1] to [3], wherein the conductive particles in contact with the second elastomer layer extrude with respect to the elastomer part of the first elastomer layer heading for a side opposite to the second elastomer layer.

The numerical ranges indicated with the use of the term "to" in the present invention refer to ranges including the numerical values before and after the term "to" respectively as the lower limit and the upper limit.

Advantageous Effects of Invention

The coin-shaped cell of the present invention can quickly response a low resistance current flows situation under applied pressure more than pressure-sensitive conductivity threshold, minimize extreme current concentration and the cell resistance variation by the applied pressure in current flows situation, and exhibit desired pressure sensitivity even in repeated use.

BRIEF DESCRIPTION OF THE DRAWINGS

FIG. 1 is a schematic cross-sectional view showing a configuration of a common coin-shaped cell.

FIG. 2 is a schematic cross-sectional view showing a preferable configuration of the coin-shaped cell of the present invention.

FIG. 3 is a schematic cross-sectional view showing a preferable configuration of the coin-shaped cell of the present invention.

FIG. 4 is a schematic cross-sectional view showing a preferable configuration of the coin-shaped cell of the present invention.

FIG. 5 is a schematic cross-sectional view showing a preferable configuration of the coin-shaped cell of the present invention.

FIG. 6 is a schematic cross-sectional view showing a preferable configuration of the coin-shaped cell of the present invention.

FIG. 7 is a schematic cross-sectional view showing a preferable configuration of the coin-shaped cell of the present invention.

FIG. 8 is a schematic cross-sectional view showing a preferable configuration of the coin-shaped cell of the present invention.

FIG. 9 is a schematic cross-sectional view showing a preferable configuration of the coin-shaped cell of the present invention.

FIG. 10 is a schematic cross-sectional view showing a preferable configuration of a pressure-sensitive conductive film used for the present invention.

FIG. 11 is a schematic cross-sectional view showing a preferable configuration of a pressure-sensitive conductive film used for the present invention.

FIG. 12 is a schematic cross-sectional view showing a preferable configuration of a pressure-sensitive conductive film used for the present invention.

FIG. 13 is a schematic cross-sectional view showing a preferable configuration of a pressure-sensitive conductive film used for the present invention.

DESCRIPTION OF EMBODIMENTS

[Coin-Shaped Cell]

Preferred embodiments of the coin-shaped cell of the present invention will be described with reference to the drawings. Incidentally, each of the drawings is explanatory diagrams for facilitating understanding of the present invention, and regarding sizes and relative magnitude relationships of respective elements, the large one or the small one is sometimes changed for the purpose of illustration, and the form does not show a real relation as it is. Furthermore, the present invention is not limited to the appearance, shape and the like illustrated in these drawings, except for the requirements defined by the present invention. In the present invention, the "coin-shaped cell" includes a button-shaped cell. That is, a shape and a diameter of the coin-shaped cell are not specifically limited. For example, a button-shaped cell whose thickness is larger than a diameter is included in the coin-shaped cell.

FIG. 1 is a vertically sectional view schematically showing a common coin-shaped cell. The coin-shaped cell shown in FIG. 1 includes an exterior body composed of a battery cell case 1, a sealing plate 6 and a gasket 5.

The battery cell case 1 includes a bottom plate 1a and a side portion 1b rising from a rim of the bottom plate 1a, and is a circular battery can in plan view having a shallow bottom.

The sealing plate 6 includes a top plate 6a, and a rim portion 6b extending from the top plate 6a to the inside of the side portion 1b of the battery cell case 1.

The gasket 5 is interposed between an inside of the side portion 1b of the battery cell case 1 and the rim portion 6b of the sealing plate 6 in a state of being compressed. That is, the gasket 5 is disposed inside the side portion 1b of the battery cell case 1 and outside the rim portion 6b of the sealing plate 6 to seal a gap between the battery cell case 1 and the sealing plate 6. To electrically insulate the battery cell case 1 and the sealing plate 6, the gasket 5 is preferably disposed so as to cover the rim portion 6b of the sealing plate 6 including an end portion of the rim portion 6b.

Power generation elements are stored in the exterior body. The power generation elements include a positive electrode 2, a negative electrode 3, a separator 4, and an electrolytic solution (not shown). In the shown example, the positive electrode 2 is disposed so as to be in contact with the bottom plate 1a of the battery cell case 1. Therefore, the outer surface of the bottom plate 1a of the battery cell case 1 serves as a positive electrode terminal. While, the negative electrode 3 is disposed so as to be in contact with the top plate 6a of the sealing plate 6. Therefore, the outer surface of the face top plate 6a of the sealing plate 6 serves as a negative electrode terminal.

In the configuration of FIG. 1, the use of a metal plate having a corrosion resistance at a positive electrode potential as a formation material of the battery cell case 1 is preferred. For example, with the use of a lithium cell, the use of, for example, stainless steel (for example, SUS430, SUS444, and SUS329J), titanium, and a titanium alloy as the formation material of the battery cell case 1 is preferred. Formation of a nickel-plated layer on the outer surface side of the battery cell case is preferred.

In the configuration of FIG. 1, as long as the sealing plate 6 functions as a negative electrode terminal, the formation material of the sealing plate 6 is not especially limited. The use of a metal plate having a predetermined mechanical strength as the formation material of the sealing plate 6 is preferred, and among them, the stainless steel (for example, SUS304, SUS316, and SUS430) is preferred. Alternatively, a metal plate such as inexpensive ordinary steel or carbon steel may be employed. The ordinary steel is steel such as an SS material, an SM material, and an SPCC material defined by Japanese Industrial Standards (JIS). The carbon steel is steel such as S10C, S200, S300, S45C, and S55C, and belongs to a mechanical structural alloy steel. When the ordinary steel or carbon steel is employed, it is desirable that a plated layer for corrosion prevention (for example, a nickel-plated layer) is formed on the inside of the cell. Usually, nickel-plated layers are formed on both surfaces of an inner surface side and an outer surface side of a sealing plate made of the ordinary steel or carbon steel. A nickel-plated layer is also formed on the outer surface side of the sealing plate formed of stainless steel.

In the coin-shaped cell of the present invention, a pressure-sensitive conductive film described later is disposed on an outer surface of at least one of the battery cell case 1 and the sealing plate 6 (that is, a surface of at least one of an outer surface of the positive electrode terminal and an outer surface of the negative electrode terminal). A range covered with the pressure-sensitive conductive film can be appropriately set according to the purpose within a range of not losing the effects of the present invention. Preferred examples of arrangement configurations of the pressure-sensitive conductive film will be described.

<Arrangement of Pressure-Sensitive Conductive Film-1>

As shown in FIG. 2, a pressure-sensitive conductive film 7 can be disposed in contact with an outer surface of the top plate 6a of the sealing plate 6. In this case, on an exposed portion other than the top plate 6a of the sealing plate 6, to prevent an external short-circuit in case of accidental ingestion, an insulating coating 8 needs to be provided. The insulating coating 8 coats the outer surface of a side portion 6b of the sealing plate 6 positioned between the pressure-sensitive conductive film 7 and the gasket 5. From an aspect of preventing a penetration of a bodily fluid in case of accidental ingestion with more certainty, the insulating coating 8 is preferably provided so as to cover both end portions from the end portion of the pressure-sensitive conductive film 7 to the end portion of the side portion 1b of the battery cell case 1 (FIG. 2 shows this configuration).

<Arrangement of Pressure-Sensitive Conductive Film-2>

As shown in FIG. 3, a configuration in which a part between the outer surface of the top plate 6a of the sealing plate 6 and a part covered with the gasket 5 in the outer surface of the rim portion 6b of the sealing plate 6 is directly covered with the pressure-sensitive conductive film 7 can be employed. In this case, since the outer surface of the sealing plate 6 has no exposed portion, a process with the insulating coating 8 is not always necessarily. However, from an aspect of preventing a penetration of a bodily fluid and an external short-circuit in case of accidental ingestion with more certainty, the insulating coating 8 is preferably provided so as to cover both end portions from the end portion of the pressure-sensitive conductive film 7 to the end portion of the side portion 1b of the battery cell case 1 (FIG. 3 shows this configuration).

<Arrangement of Pressure-Sensitive Conductive Film-3>

As shown in FIG. 4, a pressure-sensitive conductive film 7 can be wholly disposed in contact with an outer surface of the battery cell case 1. In this case, to prevent external short-circuit in case of accidental ingestion, the insulating coating 8 needs to be provided on the end portion of the side portion 1b of the battery cell case 1. From an aspect of preventing the penetration of bodily fluid and the external short-circuit in case of accidental ingestion with more certainty, the insulating coating 8 can be disposed from the end portion of the pressure-sensitive conductive film 7 to the rim portion 6b of the sealing plate 6. Alternatively, the insulating coating 8 can be provided so as to cover both end portions from the end portion of the pressure-sensitive conductive film 7 to the end portion of the top plate 6a of the sealing plate 6 (FIG. 4 shows this configuration).

<Arrangement of Pressure-Sensitive Conductive Film-4>

As shown in FIG. 5, a configuration in which the outer surface of the battery cell case 1 and a part between the end portion of the side portion 1b of the battery cell case 1 and the middle of the gasket 5 are directly covered with the pressure-sensitive conductive film 7 can be employed. In this case, since the outer surface of the battery cell case 1 has no exposed portion, a process with the insulating coating 8 is not always necessarily. However, from an aspect of preventing a penetration of a bodily fluid and an external short-circuit in case of accidental ingestion with more certainty, the insulating coating 8 is preferably provided from the end portion of the pressure-sensitive conductive film 7 to the rim portion 6b of the sealing plate 6. Alternatively, the insulating coating 8 can be provided from the end portion of the pressure-sensitive conductive film 7 to the end portion of the top plate 6a of the sealing plate 6, that is, so as to cover both end portions (FIG. 5 shows this configuration).

Note that the insulating coating 8 shown in FIG. 2 to FIG. 5 can be coated after the pressure-sensitive conductive film is disposed on the coin-shaped cell, but the present invention is not limited to the configuration. An example of a coating method includes a method that dissolves an insulating material into a solvent, applies or sprays the prepared coating liquid, and then volatilizes the solvent to form an insulation film.

As described above, providing the insulating coating 8 is preferred in the arrangements 1 to 4 of the pressure-sensitive conductive film. Meanwhile, regulating the arrangement of the conductive particles in charge of a conductive property of the pressure-sensitive conductive film allows giving an anisotropic function of being not electrically conducted in a surface direction even a pressure at a threshold or more is applied to the pressure-sensitive conductive film. With the use of the anisotropic pressure-sensitive conductive film, by only disposing the pressure-sensitive conductive film so as to cover a desired part of the cell surface, even without the insulating coating 8, the penetration of the bodily fluid and external short-circuit in case of accidental ingestion can be prevented with more certainty. An example of the configuration will be described. Note that arrangement of the conductive particles to cause the pressure-sensitive conductive film to develop the anisotropic function will be described later in detail.

<Arrangement of Pressure-Sensitive Conductive Film-5>

In the arrangement of the pressure-sensitive conductive film shown in FIG. 6, a configuration that the pressure-sensitive conductive film 7 having the anisotropic function are integrally coated so as to cover the end portion which is the entire part exposed to the outer surface of the sealing plate 6 and therefrom the end portion of the side portion 1b of the battery cell case 1, is employed. Since in the configuration, the pressure-sensitive conductive film 7 is not electrically conducted in the surface direction, even without the insulating coating 8, external short-circuit in case of accidental ingestion can be prevented with more certainty, and therefore the configuration is preferred (FIG. 6 shows this configuration).

<Arrangement of Pressure-Sensitive Conductive Film-6>

As shown in FIG. 7, a configuration in which the entire outer surface of the battery cell case 1 and a part from the outer surface to the rim portion 6b of the sealing plate 6 are integrally coved with the pressure-sensitive conductive film 7 having the anisotropic function can be employed. This configuration is preferable to be configured to cover the entire outer surface of the battery cell case 1 and the portion from the outer surface to the end or their proximity of the top plate 6a of the sealing plate 6 with the pressure-sensitive conductive film 7. This configuration is preferable to be able to prevent from external short-circuit in case of accidental ingestion without insulation coating 8 with more certainty.

Although details of the configuration of the pressure-sensitive conductive film will be described later, when the pressure-sensitive conductive film is in contact with the battery cell case and the sealing plate via a second elastomer layer 10, it is able to be configured to dispose the second elastomer layer 10 on a desired part as an insulating coating, and then set a first elastomer layer 9 containing conductive particles at a desired part of this second elastomer 10 so as to be a single layer and mutually contactless in a planar direction. FIG. 8 and FIG. 9 show examples of the configuration.

(Pressure-Sensitive Conductive Film)

When a certain pressure or more is not applied from the outside, the pressure-sensitive conductive film used for the present invention is in an insulation (a high resistance) state, and when the certain pressure or more is applied from the outside, the pressure-sensitive conductive film can generate a conductive (a low resistance) state in a film thickness direction.

The pressure-sensitive conductive film used for the present invention includes a first elastomer layer that holds the conductive particles, and a second elastomer layer which is disposed on at least one surface of the first elastomer layer and is in contact with at least a part of the conductive particles among the conductive particles held to the first elastomer layer. The conductive particles are disposed in a single layer in a planar direction of the first elastomer layer.

The preferred embodiments of the pressure-sensitive conductive film used for the present invention will be described.

—Pressure-Sensitive Conductive Film [Configuration 1]—

One preferred example of the pressure-sensitive conductive film used for the present invention (a configuration 1) will be described with reference to the schematic cross-sectional view shown in FIG. 10. A pressure-sensitive conductive film 12 of the configuration 1 includes a first elastomer layer 9 that holds conductive particles 11 (the first elastomer and the conductive particles 11 are collectively referred to as the first elastomer layer 9), and a second elastomer layer 10 disposed on the lower surface of the first elastomer layer 9 and in contact with at least a part of the conductive particles 11. The second elastomer layer 10 functions as an insulating layer between the conductive particles 11 and a conductive base material 13 (equivalent to the sealing plate or the battery cell case of the coin-shaped cell).

The conductive particles 11 have an average particle diameter larger than a thickness of the elastomer part of the first elastomer layer 9, and at least a part of the conductive particles 11 extrudes from the elastomer part of the first elastomer layer 9. Considering an aspect of production, in the configuration 1, the conductive particles 11 held to the first elastomer layer 9 and in contact with the second elastomer layer 10 preferably do not extrude to the second elastomer layer 10 side.

In the configuration 1, when the certain pressure or more is applied in the thickness direction (from the top to the bottom in FIG. 10) of the pressure-sensitive conductive film 12 from outside with a contact terminal (external terminal), the conductive particles 11 held to the first elastomer layer 9 penetrates through the second elastomer layer 10 and the conductive base material 13 and the external terminal are electrically connected to each other with the conductive particles 11. That is, an electric circuit of the "(external terminal)-(conductive particles 11)-(conductive base material 13)" is formed. Since any elastomer layer is not involved in the electrical conduction of the electric circuit and therefore a resistance is independent of the external pressure, an electrically conductive state at a low resistance can be achieved.

In the configuration 1, the conductive particles are disposed in the single layer in the planar direction of the first elastomer layer 9. Therefore, the pressure-sensitive conductive film allows quickly generating the current supply state at the low resistance in the film thickness direction by applying a pressure in the thickness direction.

Note that, in the present invention, the "conductive particles are disposed in the single layer in the planar direction of the first elastomer layer" means that the conductive particles are actually disposed in the single layer in the planar direction of the first elastomer layer. That is, within a range of not losing the effects of the present invention, at a part of the first elastomer layer, the two or more conductive particles may overlap in the thickness direction of the first elastomer layer (for example, a state where the particles put on between the conductive particles or the two particles overlap in the film thickness direction). In the configuration that "the conductive particles are disposed in the single layer in the planar direction of the first elastomer layer", 70% (in the basis of the number of particles) or more of the conductive particles among all conductive particles constituting the first elastomer layer are disposed in the single layer without overlapping with one another in the film thickness direction. It is also preferred that all conductive particles do not overlap in the film thickness direction and are disposed in the single layer.

As described above, the average particle diameter of the conductive particles 11 is larger than the thickness of the elastomer part of the first elastomer layer 9, and at least a part of the conductive particles 11 extrude from the elastomer part of the first elastomer layer 9. The extrusion from the elastomer part of the first elastomer layer 9 means that the conductive particles 11 are in a state of ensuring directly contact with the external terminal (the contact terminal). That is, this includes a case where the particle diameter of the conductive particle 11 is same as the thickness of the elastomer part of the first elastomer layer 9.

Additionally, the average particle diameter of the conductive particles 11 is preferably set to be larger than the total thickness of the elastomer part of the first elastomer layer 9 and the second elastomer layer 10. This allows reducing a variation of the resistance with the pressure change further and keeping the contact between the conductive particles 11 and the external terminal certainly in the situation of contact the conductive particles 11 with the conductive base material 13 by applying the certain pressure or more.

With the pressure-sensitive conductive film of the configuration 1, by releasing the applied pressure, elasticity of the first elastomer layer 9 and the second elastomer layer 10 compositely acts, and the conductive particles 11 can return to positions before the application of the pressure (the state in FIG. 10). By returning the conductive particles 11 to the positions before the application of the pressure, a break of the second elastomer layer 10 is covered by the elasticity of itself, thereby ensuring recovering the initial insulation state. The recovery property will be referred to as "self-restorability" in the present invention.

By the pressure-sensitive conductive film 12 showing the self-restorability, even when the coin-shaped cell is inserted into or removed from an electronic device, while external short-circuit in case of accidental ingestion is prevented, a stable conductive state is achieved with respect to an applied pressure to a terminal of the device during use.

Subsequently, the conductive particles 11, the first elastomer layer 9, and the second elastomer layer 10 in the configuration 1 will be described in more detail.

——Conductive Particle 11——

The conductive particles 11 include primary particles and secondary particles, and preferably are the primary particles. This is owing to obtain the further stable conductive state at the low resistance in a state that the conductive particles 11 are pushed with the external terminal to break the second elastomer layer 10 and are in direct contact with the conductive base material 13. The conductive particle 11 preferably has a true sphere shape. Whether the conductive particle 11 has the true sphere shape can be grasped by, for example, magnification observation. The "true sphere shape" in the present invention means the spherical body, and includes a case of not only the spherical body being a perfect sphere shape, but also an approximate sphere shape that can be apparently grasped as a sphere shape.

When the conductive particle 11 has the true sphere shape, sphericity represented by the following formula is preferably from 70 to 100.

$$\text{Sphericity} = 100 \times [1-(Sa-Sb)/Sa]$$

Sa: Area of circumscribed circles of the conductive particles in a planar image of the conductive particles
Sb: Area of inscribed circles of the conductive particles in the planar image of the conductive particles The conductive particles 11 used for the present invention are randomly observed by 50 pieces with microscope, the areas of the circumscribed circles and the inscribed circles obtained in the basis of the planar images are applied to the above-described formula, the sphericity of each of the 50 pieces is calculated, and thus the sphericity is defined as an average value of the sphericity values of the respective 50 pieces.

With the conductive particle 11 having the true sphere shape, the shape may be defined by degree of circularity. The degree of circularity can be determined in the basis of observation in plan view of the conductive particles or a film held of the conductive particles. The maximum value of the degree of circularity is defined as 1, and as the diagram becomes complicated, the value decreases. The degree of circularity can be obtained by the following equation.

$$\text{Degree of circularity} = 4\pi \times (\text{area}) \div (\text{perimeter})^2$$

For example, with a true circle having a radius of 10, the degree of circularity=$4\pi \times (10 \times 10 \times 7) \div (10 \times 2 \times 7)^2$"=1 (the maximum value) is found. That is, the true circle is a diagram that is the least complicated in terms of the degree of circularity. Incidentally, a degree of circularity of a square is 0.785 and a degree of circularity of an equilateral triangle is about 0.604. Thus, the equilateral triangle is a diagram more complicated than the square. The degree of circularity of the conductive particle 11 is preferably from 0.7 to 1.0.

As long as the conductive property can be ensured, the material of the conductive particles 11 is not specifically limited. Examples thereof include metal particles, metal-coated particles, conductive non-metal particles (for example, graphite).

Examples of the metal particles include Au, Ag, Cu, Ni, Pd, and platinum. As the metal-coated particles, copper-silver-coated particles, glass-silver-coated particles, silica-silver-coated particles, and divinylbenzene copolymer-Ni/Au-coated particles can be used. Considering the cost and the conductive performance, for example, glass-silver-coated particles and silica-silver-coated particles are preferred. As the conductive non-metal particles, for example, spherical mesocarbon microbeads and artificial graphite by a spheronization treatment are preferred.

From contact stability of the conductive particles with the cell during use of a device, as the conductive particles, Ni-based metal particles same as a nickel plating on the outer surface of the cell is preferred. Additionally, for the purpose of enhancing, for example, the conductive property, an additive may be partially contained.

The average particle diameter d of the conductive particles 11 is preferably $10 \leq d \leq 200$ µm. The average particle diameter is a volume basis median diameter. The median diameter is equivalent to accumulation of 50% when a particle size distribution is expressed as a cumulative distribution. The conductive particles used for the first elastomer layer have some extended monodisperse in a grain size distribution preferably. Among all conductive particles 11 held to the first elastomer, 70% (in the basis of the number of particles) or more, preferably 80% or more, further preferably 90% or more, and especially preferably all of the particle diameters of the conductive particles 11 are preferably in a range of (average particle diameter)±(average particle diameter)×0.5, and further preferably in a range of (average particle diameter)±(average particle diameter)×0.4. A measuring method of the grain size distribution may be, for example, device analysis by laser diffraction scattering method, or granularity may be measured from the surface of the actual film.

The average particle diameter d of 10 µm or more improves handling performance of the conductive particles 11 and allows disposing the conductive particles 11 in the desired single layer in the planar direction with more certainty. The average particle diameter d of the conductive particles 11 is preferably 20 µm or more, and further preferably 30 µm or more. Meanwhile, the average particle diameter d of the conductive particles 11 being 200 µm or less allows reducing the total thickness of the pressure-sensitive conductive film 7 and allows enhancing applicability to the coin-shaped cell. Size standards (a thickness and a diameter) of the coin-shaped cell corresponding to the used device are determined. From an aspect of ensuring a cell capacity while the sizes are set to sizes within the standard tolerances, the average particle diameter d of the conductive particles 11 is more preferably 150 µm or less, and further preferably 100 µm or less.

The descriptions of the above-described conductive particles are preferably applied to configurations 2 to 4 described later.

Configurations applicable to the present invention related to the anisotropic pressure-sensitive conductive film as the more preferable configurations of the pressure-sensitive conductive film using the conductive particles will be described here. Usually, in the anisotropic pressure-sensitive conductive film, an electric circuit that crosses in the surface direction of the pressure-sensitive conductive film is not formed, and the pressure-applied part is electrically conductive in the film thickness direction. However, in the present invention, for example, in the case of the above-described arrangement-5 and arrangement-6 of the pressure-sensitive conductive film, as understood from the configurations, it is necessary that only the part disposed on the gasket can develop anisotropic conduction. The pressure-sensitive conductive film is also one configuration of the anisotropic pressure-sensitive conductive film in the present invention. As a concrete image of the pressure-sensitive conductive film, a configuration is that the anisotropic conductive part is present in a doughnut shape by an area same as the gasket part exposed to the surface or more in case of plant viewing the coin-shaped cell. In the present invention, the entire surface of the anisotropic pressure-sensitive conductive film may have an anisotropic conductive property. Development of the anisotropic conduction means that the conductive particles are not mutually in contact in the surface direction at both of no load and application of a load, and the electric circuit in the surface direction is not formed. A distance between the adjacent conductive particles that are mutually contactless is preferably from 10 μm to 400 μm, more preferably from 50 to 300 μm, and further preferably from 100 to 200 μm.

Here, the following will describe a measuring method of a resistance change due to the applied pressure of the pressure-sensitive conductive film and the like.

The resistance change due to the applied pressure of the pressure-sensitive conductive film is, for example, measurable by adhesion of a film on the metal plate, applying a terminal from the upper portion, and performing a direct current method or an alternate current method. In the direct current method, since an influence due to heat generation is received depending on the measurement period and a stable value cannot be obtained, the alternate current method is preferred. To reliably confirm the influence on the joining surface with the coin-shaped cell and whether the film itself develops the anisotropic conduction, measurement by the alternate current method (1 KHz) in the state of the pressure-sensitive conductive film disposed in the coin-shaped cell is preferred. The measurement is preferably performed on several positions. Examples of the several positions are three positions in total, the center of the film and two positions near the outermost periphery, and preferably further the addition of two positions at between the center of the film and the outermost periphery, five or more positions in total. Regarding the measurement positions, a part other than them may be measured, and, for example, measurement at constant intervals, for example, 1-mm intervals allow confirming uniformity of the film. For confirmation of the anisotropic conduction, a positive electrode case or the sealing plate near the caulked portion is measured. In a case where the anisotropy is absent, a resistance value becomes lower than that of the cell alone. The load of the applied pressure is from 0.1 to 10 N, preferably from 0.3 to 7 N, and further preferably from 0.5 to 5N.

The resistance value of the cell including the pressure-sensitive conductive film measured by the measuring method described above is preferably 500Ω or more, and more preferably 1,000Ω or more in a state close to non-load (for example, 0.01 N). Under the applied pressure at the threshold or more, the resistance value is preferably 50Ω or less, more preferably 30Ω or less, and further preferably 10Ω or less. Additionally, the resistance value is preliminarily measured by the cell alone in which the pressure-sensitive conductive film is not disposed, and the resistance value is subtracted from the resistance value of the cell in which the pressure-sensitive conductive film is disposed, thereby the resistance value of the pressure-sensitive conductive film can be evaluated. The resistance value in the basis of the difference with the applied pressure at the threshold or more is preferably 10Ω or less, more preferably 5Ω or less, and further preferably 2Ω or less. Note that the resistance of the common coin-shaped cell is different depending on the size, but is usually around from 3Ω to 40Ω.

——First Elastomer Layer 9——

The first elastomer layer 9 is a layer that holds the conductive particles 11 and achieves the self-restorability. As the first elastomer layer 9, various kinds of elastomers, such as silicone-based, acrylic-based, and urethane-based elastomers are usable.

The description will be given of a physical value of the first elastomer layer 9. A 100% modulus of the elastomer part constituting the first elastomer layer 9 is preferably 0.1 MPa or more, more preferably 0.5 MPa or more, and further preferably 1.0 MPa or more. Setting the 100% modulus of the elastomer part constituting the first elastomer layer 9 to be 0.1 MPa or more allows developing the self-restorability with more certainty and increasing the 100% modulus allows further enhancing the self-restorability. The 100% modulus of the elastomer part constituting the first elastomer layer 9 is usually 10 MPa or less, and 7 MPa or less is practical. The 100% modulus is a stress value at 100% extension (at double extension) of the elastomer obtained by the tensile test compliant to JIS K 6251, and is a value found by dividing a tensile load by a cross-sectional area of a specimen before the test.

A height of the extrusion portion of the conductive particle 11 from the elastomer part surface of the first elastomer layer 9 is preferably equal to or less than the half (½d or less) of the average particle diameter d of the conductive particles 11, and is more preferably smaller than (preferably ⅖d or less) the half of the average particle diameter d of the conductive particles 11. The extrusion height allows conductive particles 3 to be held to the inside of the first elastomer layer 9 with more certainty, and allows further enhancing the self-restorability. Additionally, the height of the extrusion portion of the conductive particle 11 from the elastomer part surface of the first elastomer layer 9 is preferably ½₀d or more, and more preferably ⅟₁₀d or more. This allows keeping the high responsiveness at the contact with the external terminal with more certainty. Furthermore, the extrusion height of the conductive particles 11 is preferably larger than the thickness of the second elastomer layer.

The volume resistivity of the elastomer part of the first elastomer layer 9 is preferably $1 \times 10^8$ Ω·cm or more, and more preferably $1 \times 10^{10}$ Ω·cm or more.

To form the first elastomer layer 9 of the pressure-sensitive conductive film 12, the first elastomer or its precursor and the conductive particles 11 are set, in terms of a volume ratio, to be preferably [the first elastomer or its precursor]:[the conductive particles 11]=0.1:1 to 20:1, more preferably [the first elastomer or its precursor]:[the conductive particles 11]=0.3:1 to 16:1, and further preferably [the first elastomer or its precursor]:[the conductive particles 11]=0.5:1 to 14:1. This can be prepared by mixing them in a solvent as necessary to obtain a mixed liquid (a dispersion liquid of the conductive particles), applying the mixed liquid such that the conductive particles 11 become the single layer, and drying and curing the product. With the above-described volume ratios, the conductive particles 11 can be held by the first elastomer with more certainty and the contact points between the conductive particles 11 and the external terminal can be sufficiently ensured.

For example, by setting [the first elastomer or its precursor]/[the conductive particles 11]=0.5/1 or more in terms of the volume ratio, the height of the extrusion portion of the conductive particle 11 from the elastomer part surface of the first elastomer layer 9 can be the half or less (½d or less) of the average particle diameter d of the conductive particles 11. This allows the conductive particles 11 to be held inside the first elastomer layer 9 with more certainty and allows preventing the conductive particles 11 from dropping off.

To develop the anisotropy in the entire surface of the pressure-sensitive conductive film, the film is formed with the volume ratio within the range of [the first elastomer or its precursor]:[the conductive particles 11] of preferably 0.5:1 to 14:1, more preferably 2:1 to 14:1. The film formation allows contactlessly disposing the mutual conductive particles 11 in the first elastomer layer 9 across the entire surface of the pressure-sensitive conductive film with more certainty. Further, within the range of not losing the desired pressure-sensitive conductive performance, for example, solid electrical insulating particles (for example, KMP-601 manufactured by Shin-Etsu Chemical Co., Ltd.), such as spherical silicone elastomer powder and silicone resin powder, can be combined in the mixture as the first elastomer to form the film.

The thickness of the elastomer part of the first elastomer layer can be appropriately set in consideration of, for example, the particle sizes of the conductive particles and self-restoration performance. For example, the thickness can be set to be 5 to 100 μm, more preferably 10 to 100 μm, and further preferably 20 to 100 μm. The preferred layer thickness is preferably applied to configurations 2 to 4 described later.

——Second Elastomer Layer 10——

The second elastomer layer 10 is a layer to keep the electrical insulating property until expose to the certain pressure application state. Additionally, the second elastomer layer 10 compositely acts with the first elastomer layer to achieve the self-restorability.

The tensile strength of the second elastomer layer 10 is preferably 0.05 MPa or more. Setting the tensile strength of the second elastomer layer 10 to 0.05 MPa or more allows recovering the second elastomer layer 10 broken by the conductive particles 11 with more certainty when the pressure application state is released. Moreover, the tensile strength of the second elastomer layer 10 is preferably 8.0 MPa or less. Setting the tensile strength to 8.0 MPa or less allows penetrating through the second elastomer layer 10 with the conductive particles 11 with more certainty when the pressure is applied.

The tensile strength is a value found by dividing the maximum tensile force recorded when the specimen is pulled until cut by the cross-sectional area of the specimen before the test at the measurement compliant to JIS K 6251.

The second elastomer layer is required to have electrical insulating property, and its volume resistivity is preferably $1 \times 10^8$ Ω·cm or more, and more preferably $1 \times 10^{10}$ Ω·cm or more.

The thickness of the elastomer part of the second elastomer layer can be appropriately set considering, for example, the particle sizes of the conductive particles and the insulation performance. For example, the thickness can be set to be 0.1 to 100 μm, more preferably 1 to 80 μm, and further preferably 2 to 50 μm. The preferred layer thickness is preferably applied to configurations 2 to 4 described later.

In the pressure-sensitive conductive film used for the present invention, a relationship between a thickness of the elastomer part of the first elastomer layer and the thickness of the second elastomer layer can be appropriately set. From an aspect of achieving both of the quick pressure-sensitive conductive property at the low resistance and the self-restorability at a further high level, the thickness of the elastomer part of the first elastomer layer is preferably thicker than the thickness of the second elastomer layer.

The pressure-sensitive conductive film used for the present invention can have a configuration of the thinned second elastomer layer, which is a great advantage in improving the performance of a coin type cell of the present invention and reducing dimension limitation of the cell. Technical actions obtained by forming the thinned second elastomer layer will be described below on the basis of the comparison with the technique described in Patent Literature 1.

In the pressure-sensitive quantum tunneling composite coating (QTCC) in Patent Literature 1, in the dried state (in the state without a liquid), the load is applied to the button cell with the planar terminal having the certain area (the electrode) and the voltage of the cell is monitored by the direct current method.

With the button cell alone (the QTCC is absent), after the terminal (the electrode) contacts the cell, the cell voltage (the closed circuit voltage) rapidly develops at the load of 1 N/sq cm and thereafter the cell voltage has the constant cell voltage value. Meanwhile, with the button cell in which the QTCC is disposed on the surface, from around the point of the load in excess of 25 N/sq cm, the cell voltage (the closed circuit voltage) gradually increases within the range of the amount of displacement of 0.1 to 0.2 mm, and at the load of 100 N/sq cm, the cell voltage has the cell voltage value equal to the case of the button cell alone (the QTCC is absent), and thereafter the cell voltage has the constant value.

Accordingly, it is found that the decrease in the film thickness by 0.1 to 0.2 mm within the load range from 25 N/sq cm to 100 N/sq cm, the resistance value of the film itself changes in the QTCC. There is an actual device terminal or the like having a pointed distal end, and when only a part of it is strongly pressed in a concentrated manner, the film thickness of the part is locally thinned to be conductive, entering the anisotropic conductive state. In the anisotropic conductive state, the current concentrates on the local conductive part, resulting in, for example, deterioration of the resin part constituting the film due to Joule heat.

In contrast to this, with the pressure-sensitive conductive film used for the present invention, the second elastomer layer can be designed to be an ultra-thin film, and consequently, the electric circuit of the "(external terminal)-(conductive particles)-(cell terminal)" can be instantly formed by applying the pressure. Moreover, this allows a reduction to a level in which the change in the resistance value due to the load hardly occurs.

Since the pressure-sensitive conductive film used for the present invention does not cause the extreme current concentration as in the QTCC, even when the pressure-sensitive conductive film is applied to various devices, the cell performance can be sufficiently developed. Additionally, the limitation on the thickness is decreased in the pressure-sensitive conductive film of the present invention, and the thickness can be the desired thin film. Accordingly, a limitation on a cell capacity and a dimensional influence in mounting the cell to the device can be prevented.

In the pressure-sensitive conductive film used for the present invention, for example, a pigment or a dye may be contained in the first elastomer layer and the second elastomer layer for confirmation of a quality of the application state during forming the layer. Abling to confirm good or bad of coat situation by a black light illumination radiating ultraviolet of a long wavelength (a wavelength 315 to 400 nm, UVA, Ultraviolet A) to the film surface, it becomes easy to confirm the film coat condition not to found by a usual light.

The material of the above-described insulating coating 8 will be described. As the constituent material of the insulating coating 8, similarly to the first elastomer layer and the second elastomer layer, the elastomer material can be used. For example, a rubber-based material, such as a styrene butadiene rubber, a butadiene rubber, a butyl rubber, and a fluorine-containing rubber can be used. For confirmation of the application state of the insulating coating 8, a pigment or a dye may be contained in the insulating coating material. That is preferred as abling to confirm good or bad of coat situation by a black light illumination radiating ultraviolet of a long wavelength (a wavelength 315 to 400 nm, UVA, Ultraviolet A) to the film surface results in becoming easy to confirm the film coat condition not to found by a usual light,
——Production of Pressure-Sensitive Conductive Film 12——

The pressure-sensitive conductive film 12 can be formed by application method.

For example, on a release sheet, a second elastomer containing liquid produced by dissolving and dispersing a second elastomer in a solvent is applied and dried to form the second elastomer layer. The second elastomer layer can also be formed by applying a solution produced by dissolving an ultraviolet curing or a thermosetting second elastomer precursor in a solvent as necessary over the release sheet, drying the product as necessary, and then causing the product to generate a curing reaction (such as an addition reaction and a condensation reaction) by ultraviolet or heating. Note that when the second elastomer and its precursor are liquids having a low viscosity, the dissolution and dispersion in the solvent, and the drying are unnecessary.

The thickness of the formed second elastomer layer is preferably 0.1 to 100 μm, more preferably 1 to 80 μm, and further preferably 2 to 50 μm.

Subsequently, the first elastomer layer is formed on the second elastomer layer. For example, in a first elastomer containing liquid produced by dissolving and dispersing a first elastomer in a solvent, a mixed liquid (a dispersion liquid of conductive particles) obtained by mixing the conductive particles by the volume ratio of the first elastomer: the conductive particles=0.5:1 to 14:1 is applied over the second elastomer layer. A flat plate is stacked on the coating film, a pressure is applied with the flat plate to arrange the conductive particles in a single layer. Then, after the flat plate is removed, drying is performed, thereby the first elastomer layer on the second elastomer layer can be formed.

The first elastomer containing liquid can be a solution produced by dissolving an ultraviolet curing or thermosetting first elastomer precursor in a solvent as necessary. In this case, the flat plate is stacked on the coating film formed on the second elastomer layer, the pressure is applied with the flat plate to arrange the conductive particles in the single layer, after the flat plate is removed, drying is performed, and after that, the curing reaction (such as the addition reaction and the condensation reaction) is caused to be generated by ultraviolet or heat, thereby the first elastomer layer on the second elastomer layer can be obtained.

Note that when the first elastomer and its precursor themselves are liquids having a low viscosity, the dissolution and dispersion in the solvent, and the drying are unnecessary. In this case, the flat plate is stacked on the coating film formed on the second elastomer layer, the pressure is applied with the flat plate to arrange the conductive particles in the single layer, and after the curing reaction is caused to be generated by ultraviolet or heat in the state, the flat plate is removed, thus ensuring obtaining the first elastomer layer on the second elastomer layer.

As the above-described flat plate, for example, a glass plate, a resin plate, and a metal plate can be used by performing a surface treatment as necessary. The use of the glass plate on which fluorine-based coating has been performed is preferred from an aspect of a release property. Alternatively, also by ultraviolet or heating in a state of applying a pressure with an elastomer plate instead of the flat plate, a stacked body that the first elastomer layer is formed on the second elastomer layer with the conductive particles arranging in the single layer can be obtained.

The thickness of the elastomer part of the formed first elastomer layer is preferably 5 to 100 μm, more preferably 10 to 100 μm, and further preferably 20 to 100 μm.

The pressure-sensitive conductive film 12 thus obtained is cut out in a shape of being mounted to the conductive base material 13 (for example, the top plate 6a of the sealing plate) of the coin-shaped cell, stripped from the release sheet, and can be adhered on the conductive base material 13 such that the second elastomer layer is in contact with the conductive base material 13. Thus, the coin-shaped cell including the pressure-sensitive conductive film 12 can be obtained.

Moreover, in manufacturing the coin-shaped cell, the pressure-sensitive conductive film 12 can be directly formed on the conductive base material 13, such as the battery cell case 1 and the sealing plate 6. In this case, instead of the above-described release sheet, on the coin-shaped cell surface on which the pressure-sensitive conductive property is desired to be developed, the second elastomer layer 9 and the first elastomer layer 9 are formed in sequence similarly to the above.

From an aspect of shortening the layer formation period, to form the first and second elastomer layers, the use of an ultraviolet curing or thermosetting elastomer precursor is preferred.

Other preferred embodiments of the pressure-sensitive conductive film used for the present invention will be described.

—Pressure-Sensitive Conductive Film [Configuration 2]—

FIG. 11 shows another example (the configuration 2) of the pressure-sensitive conductive film 12 used for the present invention. In the configuration 2, at least a part of the conductive particles 11 held by the first elastomer 9 contacts with the conductive base material 13 in a state before the application of the pressure with, for example, the external terminal. The second elastomer layer 10 is disposed on a side opposite to the conductive base material side of the conductive particles 11. When the pressure equal to or more than the constant pressure is applied by the external terminal to the conductive base material 13 side in the perpendicular direction with the second elastomer layer 10 ensuring with the insulation state, the second elastomer layer 10 immediately above the conductive particles 11 is penetrated with the external terminal, thus ensuring achieving a satisfactory conductive state. Similarly to the configuration 1, releasing the pressure application state exhibits self-recovery property.

The pressure-sensitive conductive film of the configuration 2 can be appropriately formed in accordance with the formation method of each layer of the pressure-sensitive conductive film according to the configuration 1.

—Pressure-Sensitive Conductive Film [Configuration 3]—

FIG. 12 shows yet another example (the configuration 3) of the pressure-sensitive conductive film 12 used for the present invention. In the configuration 3, the second elastomer layers 10 are provided on both surfaces of the first elastomer layer 9 holding the conductive particles 11, and the two-layer second elastomer layers 10 are in contact with both ends of at least a part of the conductive particles. When the pressure equal to or more than the constant pressure is applied by the external terminal to the conductive base material 13 side in the perpendicular direction with the second elastomer layer 10 ensuring with the insulation state, the second elastomer layer 10 immediately above the conductive particles 11 is penetrated with the external terminal, and the second elastomer layer on the conductive base material side is also penetrated with the conductive particles 11, thus ensuring achieving a satisfactory conductive state. Similarly to the configuration 1, releasing the pressure application state exhibits self-recovery property.

The pressure-sensitive conductive film of the configuration 3 can be appropriately formed in accordance with the formation method of each layer of the pressure-sensitive conductive film according to the configuration 1.

—Pressure-Sensitive Conductive Film [Configuration 4]—

FIG. 13 shows yet another example (the configuration 4) of the pressure-sensitive conductive film 12 used for the present invention. The configuration 4 is a pressure-sensitive conductive film that the surfaces of the conductive particles 11 extruding from the first elastomer layer 9 in the configuration 1 are coated with the second elastomer layer 10. The configuration allows ensuring the insulating property in a case of not under a predetermined pressure application with more certainty. The configuration 4 is a configuration that the conductive particles 11 are coated with the constituent material of the second elastomer layer in the configuration 1.

Here, in the present invention, the "first elastomer layer" and "second elastomer layer" are not distinguished by the difference of the material but are distinguished by the difference of the function in the development of the effects of the present invention. Accordingly, while the conductive particles 11 are coated with the constituent material of the second elastomer layer in the configuration 4, the second elastomer layer is constituted by a part of the coating. That is, in the coating layer, the second elastomer layer is a part extruding from the elastomer part of the first elastomer layer 9 in the thickness direction of the pressure-sensitive conductive film 12 (a coating layer that covers the extrusion part of the conductive particles 11 from the elastomer part of the first elastomer layer 9 in FIG. 13), and the other coating layer part (the coating layer part covered with the first elastomer) constitutes the first elastomer layer. Accordingly, in FIG. 13, the second elastomer layer 10 disposed on the first elastomer layer 9 is present in a state of being separated at the elastomer part of the first elastomer layer in the surface direction.

The pressure-sensitive conductive film of the configuration 4 can be appropriately formed in accordance with the formation method of each layer of the pressure-sensitive conductive film according to the configuration 1.

While the configuration of the pressure-sensitive conductive film has been described above, the pressure-sensitive conductive film used for the present invention is not limited to the above-described configurations as long as the definitions of the present invention are met, and various kinds of modifications of the above-described respective configurations are applicable as the pressure-sensitive conductive film of the coin-shaped cell of the present invention.

In the coin-shaped cell of the present invention, the pressure-sensitive conductive film has the above-described specific structure and exhibits the self-restorability. Therefore, even when the coin-shaped cell is removed after mounted to the used device, damage of the living body in case of accidental ingestion of the coin-shaped cell can be effectively reduced. Additionally, with the configuration that the conductive particles are disposed in the single layer in the first elastomer layer, electrical conduction in the pressure application direction by one particle is possible, the current supply state at the low resistance can be quickly achieved under the application of the pressure at equal to or more than the constant pressure, and an extreme concentration of a current is less likely to occur.

Hereinafter, the present invention will be described in more detail on the basis of Examples and Comparative Examples shown in Table 1. However, the present invention is not limited to these.

EXAMPLES

[Analysis method]
<Layer Thickness>
Based on a cross-sectional surface of the pressure-sensitive conductive film, measurement was performed with a contactless laser microscope.
<Average Particle Diameter of Conductive Particles>
Measurement was performed with Microtrac Sync manufactured by MicrotracBEL Corp.
<Tensile Strength and 100% Modulus>
The tensile strength and 100% modulus was measured in accordance with JIS K 6251. The JIS No. 5 dumbbell was used as a specimen shape.
<Volume Resistivity>
The volume resistivity was measured by a double ring electrode method in accordance with JIS K 6271.

Example 1

The coin-shaped cell as shown in FIG. 1 was manufactured as follows.

As a positive-electrode active material, electrolytic manganese dioxide that was sintered at 400° C. in the air for 10 hours was used, and dry blending was performed on the sintered electrolytic manganese dioxide and expanded graphite as a conductive agent. A dispersion water solution containing polytetrafluoroethylene as a binder was added to the obtained mixed powder, and wet blending was performed. By drying the obtained mixture, a positive electrode mixture was produced. Tablet compression was performed on the positive electrode mixture in a columnar shape having a 15 mm in diameter and 2 mm in thickness, thus producing a pellet of the positive electrode 2. The pellet of the positive electrode 2 was dried for 8 hours at 250° C. While, a negative electrode 3 was produced by punching a metal lithium foil having a thickness of 0.6 mm into a circular shape having a diameter of 16 mm. As the electrolyte, a nonaqueous electrolyte produced by dissolving, at a concentration of 1.0 mol/L, lithium perchlorate ($LiClO_4$) as a solute in an nonaqueous solvent obtained by mixing propylene carbonate and 1,2-dimethoxyethane at a volume ratio of 2:1 was used.

A SUS430 (thickness: 250 μm) having a nickel plating layer with a thickness of 3 μm on the surface was drawn, to produce a battery cell case 1 in which the diameter of the bottom plate was 20 mm and the height of the side portion 1*b* was 2.8 mm.

A SUS430 (thickness: 250 μm) having a nickel plating layer with a thickness of 3 μm on the surface was pressed, to produce a sealing plate 6 in which the diameter of the top plate 6*a* was 17 mm.

A gasket 5 made of polypropylene and coated with a sealant made of blown asphalt and mineral oil was disposed on the sealing plate 6. A negative electrode 3 was adhered on the inside of the top plate 6*a* of the sealing plate 6. Next, a polypropylene-made nonwoven fabric having a thickness of 300 μm was disposed as the separator 4. Then, the positive electrode 2 was disposed on the separator 4. Then, the nonaqueous electrolyte was poured into the sealing plate 6. A sealing agent made of a blown asphalt and a mineral oil was preliminarily applied over the inside of the side portion 1*b* of the battery cell case 1, and after the sealing plate 6 was covered with the battery cell case 1, the end portion of the side portion 1*b* of the battery cell case 1 was curved to the inside and was caulked to the rim portion 6*b* of the sealing plate 6 via the gasket 5, and thus a coin-shaped cell (CR2032, 20.0 mmφ×thickness 3.2 mm) was manufactured. The cell (about 3.5 V) after assembly was pre-discharged by an amount of a predetermined electric capacity such that the cell voltage became 3.2 V.

The entire outer surface of the sealing plate and the entire part from the outer surface to the end portion of the side portion 1*b* of the battery cell case of the coin-shaped cell (CR2032, 20.0 mmφ×thickness 3.2 mm) manufactured as described above were formed as the conductive base material, and the pressure-sensitive conductive film shown in FIG. 10 and subsequently the insulating coating 8 were formed on the conductive base material to manufacture the coin-shaped cell shown in FIG. 2. The specific description will be given below.

On the surface of the conductive base material, an ultraviolet (UV) curing silicone elastomer precursor (the product name: KER-4410, manufactured by Shin-Etsu Chemical Co., Ltd.) was applied, and the formed coated film was irradiated with UV and heated at 60° C. for two hours, thus forming a second elastomer layer having a thickness of 20 μm.

Subsequently, conductive particles (glass-silver-coated particles in which silver is coated on a glass bead surface, the same applies to the following) having an average particle diameter of 70 μm (the particle diameters of all of the conductive particles were within the range of 65 to 75 μm) was mixed with a UV curing silicone elastomer precursor (the product name: KER-4510, manufactured by Shin-Etsu Chemical Co., Ltd.) to meet (precursor):(conductive particles)=2:1 by the volume ratio. While vacuum defoaming was performed on the mixture with a dispenser, the mixture was scattered on the second elastomer layer to form a coated film. A glass plate performed of a fluorine-based coating was stacked on the coated film, and a pressure was applied with the glass plate (an adjustment value between 0.1 N to 4.9 N) to arrange the conductive particles in a single layer. Afterwards, irradiation was performed with UV for heating at 60° C. for two hours to cure the coated film, and the glass plate was removed, thus forming a first elastomer layer with an elastomer part having a thickness of 40 μm. Note that, as the UV light source, UV-LED (365 nm) was used. A tensile strength of the produced second elastomer layer was 3.0 MPa, and a 100% modulus of the elastomer part of the first elastomer layer was 1.0 MPa. Next, solution prepared by dissolving styrene-butadiene rubber in toluene was applied thereto and dried at 70° C., to form an insulating coating 8. Thus, the coin-shaped cell disposed of the pressure-sensitive conductive film was obtained.

Example 2

In Example 1, the formation material of the second elastomer layer was changed to the UV curing silicone elastomer precursor (the product name: KER-4551, manufactured by Shin-Etsu Chemical Co., Ltd.), and the formation material of the first elastomer layer was changed to the UV curing silicone elastomer precursor (the product name: KER-4410, manufactured by Shin-Etsu Chemical Co., Ltd.). A tensile strength of the produced second elastomer layer was 0.05 MPa, and a 100% modulus of the elastomer part of the first elastomer layer was 0.1 MPa. Except for them, the coin-shaped cell was obtained similarly to Example 1.

Example 3

In Example 1, the formation material of the second elastomer layer was changed to the UV curing silicone elastomer precursor (the product name: KER-4551, manufactured by Shin-Etsu Chemical Co., Ltd.). A tensile strength of the produced second elastomer layer was 0.05 MPa. Except for them, the coin-shaped cell was obtained similarly to Example 1.

Example 4

In Example 1, the formation material of the second elastomer layer was changed to the UV curing silicone elastomer precursor (the product name: KER-4510, manufactured by Shin-Etsu Chemical Co., Ltd.), the formation material of the first elastomer layer was changed to the UV curing silicone elastomer precursor (the product name: KER-4410, manufactured by Shin-Etsu Chemical Co., Ltd.), the conductive particles were changed to conductive particles having the average particle diameter of 10 μm (the particle sizes of all of the conductive particles were within the range of 4% of a CV value), and the precursor and the conductive particles were designed so as to be the (precursor):(conductive particles)=11:1 by the volume ratio. A tensile strength of the produced second elastomer layer was 8.0 MPa, and a 100% modulus of the elastomer part of the first elastomer layer was 0.1 MPa. Additionally, the film thickness of each layer was as shown in the following table. Except for them, the coin-shaped cell was obtained similarly to Example 1.

Example 5

The entire outer surface of the sealing plate and the entire part from the outer surface to the end portion of the side portion 1*b* of the battery cell case of the manufactured coin-shaped cell (the product name: CR2032, 20.0 mmφ× thickness 3.2 mm) were formed as the conductive base material, and the pressure-sensitive conductive film shown in FIG. 10 and subsequently the insulating coating 8 were formed on the conductive base material to manufacture the coin-shaped cell shown in FIG. 2. The specific description will be given below.

On the surface of the conductive base material, a thermosetting silicone elastomer precursor (the product name: LSR7005, manufactured by Momentive Performance Materials Japan) was applied, and the formed coated film was heated at 60° C. for 30 minutes using a ceramic heater for curing, thus forming a second elastomer layer having the thickness of 50 μm.

Subsequently, conductive particles having an average particle diameter of 150 μm (the particle diameters of all of the conductive particles were within the range of 145 to 155 μm) was mixed with a thermosetting silicone elastomer precursor (the product name: LSR7070, manufactured by Momentive Performance Materials Japan) to meet (precursor):(conductive particles)=2.5:1 by the volume ratio. While vacuum defoaming was performed on the mixture with a dispenser, the mixture was scattered on the second elastomer layer to form a coated film. A glass plate performed of a fluorine-based coating was stacked on the coated film, and a pressure was applied with the glass plate (an adjustment value between 0.1 N to 4.9 N) to arrange the conductive particles in a single layer. Afterwards, heating was performed at 60° C. for 30 minutes using the ceramic heater for curing, and the glass plate was removed, thus forming a first elastomer layer with an elastomer part having a thickness of 90 μm. A tensile strength of the produced second elastomer layer was 0.1 MPa, and a 100% modulus of the elastomer part of the first elastomer layer was 2.5 MPa. The curing speed of the elastomer layer was adjusted using a platinum catalyst. Except for them, the coin-shaped cell was obtained similarly to Example 1.

Example 6

The entire outer surface of the sealing plate and the entire part from the outer surface to the end portion of the side portion 1b of the battery cell case of the manufactured coin-shaped cell (the product name: CR2032, 20.0 mmφ× thickness 3.2 mm) were formed as the conductive base material, and the pressure-sensitive conductive film shown in FIG. 11 and subsequently the insulating coating 8 were formed on the conductive base material to manufacture the coin-shaped cell shown in FIG. 2. The specific description will be given below.

Conductive particles having an average particle diameter of 100 μm (the particle diameters of all of the conductive particles were within the range of 95 to 105 μm) was mixed with a thermosetting silicone elastomer precursor (the product name: LSR2070, manufactured by Momentive Performance Materials Japan) to meet (precursor):(conductive particles)=2.8:1 by the volume ratio. While vacuum defoaming was performed on the mixture with a dispenser, the mixture was scattered on the surface of the conductive base material to form a coated film. A glass plate performed of a fluorine-based coating was stacked on the coated film, and a pressure was applied with the glass plate (an adjustment value between 0.1 N to 4.9 N) to arrange the conductive particles in a single layer. Afterwards, heating was performed at 60° C. for 30 minutes using the ceramic heater for curing, and the glass plate was removed, thus forming a first elastomer layer with an elastomer part having a thickness of 100 μm.

Subsequently, on the first elastomer layer, a thermosetting silicone elastomer precursor (the product name: LSR2020, manufactured by Momentive Performance Materials Japan) was applied, and the formed coated film was heated at 60° C. for 30 minutes using a ceramic heater for curing, thus forming a second elastomer layer having the thickness of 10 μm. A 100% modulus of the elastomer part of the produced first elastomer layer was 2.5 MPa, and a tensile strength of the second elastomer layer was 6.2 MPa. The curing speed of the elastomer layer was adjusted using a platinum catalyst. Except for them, the coin-shaped cell was obtained similarly to Example 1.

Example 7

The entire outer surface of the sealing plate and the entire part from the outer surface to the end portion of the side portion 1b of the battery cell case of the manufactured coin-shaped cell (the product name: CR2032, 20.0 mmφ× thickness 3.2 mm) were formed as the conductive base material, and the pressure-sensitive conductive film shown in FIG. 12 and subsequently the insulating coating 8 were formed on the conductive base material to manufacture the coin-shaped cell shown in FIG. 2. The specific description will be given below.

On the surface of the conductive base material, an ultraviolet (UV) curing silicone elastomer precursor (the product name: KER-4510, manufactured by Shin-Etsu Chemical Co., Ltd.) was applied, and the formed coated film was cured by UV, thus forming a second elastomer layer having a thickness of 10 μm.

Subsequently, conductive particles having an average particle diameter of 50 μm (the particle diameters of all of the conductive particles were within the range of 45 to 55 μm) was mixed with a UV curing silicone elastomer precursor (the product name: KER-4510, manufactured by Shin-Etsu Chemical Co., Ltd.) to meet (precursor):(conductive particles)=3:1 by the volume ratio. While vacuum defoaming was performed on the mixture with a dispenser, the mixture was scattered on the second elastomer layer to form a coated film. A glass plate performed of a fluorine-based coating was stacked on the coated film, and a pressure was applied with the glass plate (an adjustment value between 0.1 N to 4.9 N) to arrange the conductive particles in a single layer. Afterwards, irradiation was performed with UV to cure the coated film, and the glass plate was removed, thus forming a first elastomer layer with an elastomer part having a thickness of 50 μm.

Further, on the first elastomer layer, a UV curing silicone elastomer precursor (the product name: KER-4510, manufactured by Shin-Etsu Chemical Co., Ltd.) was applied, and the formed coated film was subjected to the UV-curing, thus forming a second elastomer layer having the thickness of 0.1 μm. A tensile strength of the produced second elastomer layer was 8.0 MPa, and a 100% modulus of the elastomer part of the first elastomer layer was 0.1 MPa. A UV-LED (365 nm) was used as the UV light source. Except for them, the coin-shaped cell was obtained similarly to Example 1.

Example 8

The entire outer surface of the sealing plate and the entire part from the outer surface to the end portion of the side portion 1b of the battery cell case of the manufactured coin-shaped cell (the product name: CR2032, 20.0 mmφ× thickness 3.2 mm) were formed as the conductive base material, and the pressure-sensitive conductive film shown in FIG. 10 and subsequently the insulating coating 8 were formed on the conductive base material to manufacture the coin-shaped cell shown in FIG. 2. The specific description will be given below.

On the surface of the conductive base material, a solution produced by dissolving acrylic elastomer (the product name:

KURARITY LA3320, manufactured by KURARAY CO., LTD.) with toluene was applied, and the coated film was dried, thus forming a second elastomer layer having a thickness of 20 μm.

Further, conductive particles having an average particle diameter of 50 μm (the particle diameters of all of the conductive particles were within the range of 45 to 55 μm) was mixed with an acryl elastomer (the product name: Kurarity LA2250, manufactured by Kuraray Co., Ltd.) to meet (acryl elastomer):(conductive particles)=2:1 by the volume ratio. While vacuum defoaming was performed on the mixture with a dispenser, the mixture was scattered on the second elastomer layer to form a coated film. A glass plate performed of a fluorine-based coating was stacked on the coated film, and a pressure was applied with the glass plate (an adjustment value between 0.1 N to 4.9 N) to arrange the conductive particles in a single layer. Afterwards, the coated film was dried, and the glass plate was removed, thus forming a first elastomer layer with an elastomer part having a thickness of 30 μm. A tensile strength of the produced second elastomer layer was 3.2 MPa, and a 100% modulus of the elastomer part of the first elastomer layer was 3.5 MPa. Except for them, the coin-shaped cell was obtained similarly to Example 1.

Example 9

In Example 1, the formation material of the second elastomer layer was changed to a thermosetting urethane elastomer precursor (the product name: Mc115, manufactured by Tosoh Corporation was mixed with Nippollan 963, manufactured by Tosoh Corporation). The formation material of the first elastomer layer was changed to a thermosetting urethane elastomer precursor (a mixture of 1,4-butanediol/trimethylol propane (the mass ratio: 7/3) was mixed with the product name: PANDEX CPU-P130T, manufactured by DIC Corporation), the conductive particles were changed to conductive particles having an average particle diameter of 50 μm (the particle sizes of all of the conductive particles were within the range of 45 to 55 μm), and the precursor and the conductive particles were designed so as to be (precursor):(conductive particles)=6:1 by the volume ratio. A tensile strength of the produced second elastomer layer was 6.0 MPa, and a 100% modulus of the elastomer part of the first elastomer layer was 4.0 MPa. Additionally, the film thickness of each layer was as shown in the following table. Except for them, the coin-shaped cell was obtained similarly to Example 1.

All of the conductive particles used in the respective examples had the sphericity of 70 or more and the degree of circularity of 0.7 or more.

Comparative Example 1

The entire outer surface of the sealing plate and the entire part from the outer surface to the end portion of the side portion 1b of the battery cell case of the manufactured coin-shaped cell (the product name: CR2032, 20.0 mmφ× thickness 3.2 mm) were formed as the conductive base material, and the pressure-sensitive conductive film shown below to manufacture the coin-shaped cell shown in FIG. 2.

Nickel particles (nickel powder, manufactured by Vale, the average particle diameter: 3 μm) having a plurality of spike-shaped protrusions was mixed with an addition curing silicone elastomer precursor (the product name: LSR7030, manufactured by Momentive Performance Materials Japan) to meet (precursor):(nickel particles)=4:1 by the volume ratio. The mixture was cured at 170° C.×10 minutes by press heating to obtain a sheet having a thickness of 300 μm. The sheet was cut out in the shape of the surface of the conductive base material, and the cut out sheet was adhered to the conductive base material surface using a conductive adhesive. Except for them, the coin-shaped cell was obtained similarly to Example 1.

Comparative Example 2

In Comparative Example 1, except that the combination ratio of the addition curing silicone elastomer precursor and the nickel particles in the mixture was designed to be (precursor):(nickel particles)=7:3 by the volume ratio, the coin-shaped cell was obtained similarly to Comparative Example 1.

Comparative Example 1 and Comparative Example 2 are equivalent to the configurations including the pressure-sensitive coating film described in U.S. Pat. No. 9,741,975.

Comparative Example 3

The manufactured coin-shaped cell (CR2032, 20.0 mmφ× thickness 3.2 mm) was used as it was.

[Test Example 1] Pressure Application Current Carrying Property

When a load was applied in a perpendicular direction (a vertical direction, a direction heading from the negative electrode to the positive electrode) on the pressure-sensitive conductive film on the coin-shaped cell negative electrode terminal surface using a spherical surface of an external terminal distal end R of 1 mm (MISUMI Corporation: a contact probe NP60, a distal end shape N), the internal resistance was measured by alternate current method at 1 kHz. The measured internal resistance is the average value of the measured values at the three positions in total, the approximately center of the pressure-sensitive conductive film and the two positions near the outermost periphery. The loads on the respective negative electrode terminal surfaces were increased in phases, 0.01 N, 0.25 N, 0.5 N, 3 N, and 5 N. Note that a resistance (a resistance A) at each load of the cell without the pressure-sensitive conductive film was preliminarily measured, and a value found by subtracting the resistance A at the corresponding load from the resistance value at each load of the coin-shaped cell including the pressure-sensitive conductive film was defined as the internal resistance value. <Table 1> shows the internal resistance values as the "electric resistance."

[Test Example 2] Self-Restorability

In the evaluation for pressure application current carrying property, first, measurement was performed at the maximum load of 0.25 N, after that the load was released to set a state close to non-load (for example, 0.01 N), and an internal resistance when the load was caused to repeatedly reciprocate such that the load became 0.25 N again was measured. Similarly, the internal resistance was measured in case of repeatedly reciprocating at the maximum load of 0.5 N, 3 N, or 5 N. The measured internal resistance is the average value of the measured values at the three positions in total, the approximately center of the pressure-sensitive conductive film and the two positions near the outermost periphery.

Similarly to Test Example 1, the internal resistance value was a value found by subtracting the resistance A from the resistance value of the coin-shaped cell including the pressure-sensitive conductive film. Self-restorability was evaluated by applying the recovery times that the internal resistance can recover from current flow (the resistance of 2Ω or less) to insulation state (the resistance of 1,000Ω or more (O.R.)) on returning from the terminal position suppling maximum load to initial terminal position suppling no load, to followed evaluation criteria. So, if current flow state can not be recovered to the insulation state, thereafter, there is no recovery to the insulation state on repeated reciprocation of terminal.

The results are shown in <Table 1>.

<Evaluation Criteria for Self-Restorability>

⊙: 10 times or more

○: 5 to 9 times

Δ: 1 to 4 times x: 0 times

[Test Example 3] Insulation Performance in Case of Accidental Ingestion of Coin-Shaped Cell Processed meat (ham) made of pork was placed on the bottom of a petri dish having a depth of 15 mm. Then, instead of the bodily fluid, normal saline was poured into the petri dish to completely clip the ham into the normal saline.

Then, the coin-shaped cells produced above each were mounted on the ham so that the sealing plate came into contact with the ham. At this time, to avoid cell floating, setting the battery case bottom (an outer surface of a bottom plate. in this state, the bottom plate is positioned on the liquid surface side) at the position slightly lower than the liquid surface of saline result in the situation that the saline film is formed on the case bottom. This state was hold at 25° C. for 30 minutes. Then, the state of the ham contacted with the sealing plate was observed visually. When external short-circuit occurs, the ham is discolored.

The results are shown in <Table 1>.

TABLE 1

|  |  |  | Example 1 | Example 2 | Example 3 |
|---|---|---|---|---|---|
| Pressure-sensitive conductive film | Entire | Embodiment | Configuration 1 | Configuration 1 | Configuration 1 |
|  |  | Total thickness [μm] (Note 1) | 90 | 90 | 90 |
|  | First elastomer layer | Thickness of elastomer part [μm] | 40 | 40 | 40 |
|  |  | 100% modulus [MPa] | 1.0 | 0.1 | 1.0 |
|  |  | Volume resistivity [Ω · cm] | 7.0E+14 | 1.0E+14 | 7.0E+14 |
|  |  | Material | Silicone | Silicone | Silicone |
|  |  | Curing method | UV | UV | UV |
|  | Second elastomer layer | Thickness [μm] | 20 | 20 | 20 |
|  |  | Tensile strength [MPa] | 3.0 | 0.05 | 0.05 |
|  |  | Volume resistivity [Ω · cm] | 3.0E+14 | 2.0E+14 | 2.0E+14 |
|  |  | Material | Silicone | Silicone | Silicone |
|  |  | Curing method | UV | UV | UV |
|  | Conductive particles | Average particle diameter [μm] | 70 | 70 | 70 |
|  | (First elastomer):(Conductive particles) (volume ratio) |  | 2:1 | 2:1 | 2:1 |
| Cell evaluation | Pressure application current carrying property | Electric resistance [Ω] at load of 0.01N | O.R. | O.R. | O.R. |
|  |  | Electric resistance [Ω] at load of 0.25N | 0.4 | 0.4 | 0.5 |
|  |  | Electric resistance [Ω] at load of 0.5N | 0.3 | 0.3 | 0.4 |
|  |  | Electric resistance [Ω] at load of 3N | 0.1 | 0.2 | 0.4 |
|  |  | Electric resistance [Ω] at load of 5N | 0.2 | 0.1 | 0.4 |
|  | Self-restorability | Maximum load 0.25N | ⊙ | ○ | ⊙ |
|  |  | Maximum load 0.5N | ⊙ | ○ | ⊙ |
|  |  | Maximum load 3N | ⊙ | ○ | ⊙ |
|  |  | Maximum load 5N | ⊙ | ○ | ⊙ |
|  | Insulation performance in case of accidental ingestion (discolorment of ham in normal saline) |  | Discolored quite slightly | Discolored quite slightly | Discolored quite slightly |

|  |  |  | Example 4 | Example 5 | Example 6 |
|---|---|---|---|---|---|
| Pressure-sensitive conductive film | Entire | Embodiment | Configuration 1 | Configuration 1 | Configuration 2 |
|  |  | Total thickness [μm] (Note 1) | 10.1 | 200 | 110 |
|  | First elastomer layer | Thickness of elastomer part [μm] | 8 | 90 | 100 |
|  |  | 100% modulus [MPa] | 0.1 | 2.5 | 2.5 |
|  |  | Volume resistivity [Ω · cm] | 1.0E+14 | 1.0E+14 | 1.0E+14 |
|  |  | Material | Silicone | Silicone | Silicone |
|  |  | Curing method | UV | Heating | Heating |

TABLE 1-continued

|  |  |  |  |  |  |
|---|---|---|---|---|---|
| | Second elastomer layer | Thickness [μm] | 0.1 | 50 | 10 |
| | | Tensile strength [MPa] | 8.0 | 0.1 | 6.2 |
| | | Volume resistivity [Ω · cm] | 3.0E+14 | 5.0E+14 | 3.0E+14 |
| | | Material | Silicone | Silicone | Silicone |
| | | Curing method | UV | Heating | Heating |
| | Conductive particles | Average particle diameter [μm] | 10 | 150 | 100 |
| | (First elastomer):(Conductive particles) (volume ratio) | | 11:1 | 2.5:1 | 2.8:1 |
| Cell evaluation | Pressure application current carrying property | Electric resistance [Ω] at load of 0.01N | O.R. | O.R. | O.R. |
| | | Electric resistance [Ω] at load of 0.25N | 0.4 | 1.5 | 0.3 |
| | | Electric resistance [Ω] at load of 0.5N | 0.4 | 1.2 | 0.1 |
| | | Electric resistance [Ω] at load of 3N | 0.1 | 1.1 | 0.2 |
| | | Electric resistance [Ω] at load of 5N | 0.2 | 0.6 | 0.2 |
| | Self-restorability | Maximum load 0.25N | ○ | ⊙ | ○ |
| | | Maximum load 0.5N | ○ | ⊙ | ○ |
| | | Maximum load 3N | ○ | ⊙ | ○ |
| | | Maximum load 5N | ○ | ⊙ | ○ |
| | Insulation performance in case of accidental ingestion (discolorment of ham in normal saline) | | Discolored slightly | Discolored quite slightly | Discolored quite slightly |

| | | | Example 7 | Example 8 | Example 9 |
|---|---|---|---|---|---|
| Pressure-sensitive conductive film | Entire | Embodiment | Configuration 3 | Configuration 1 | Configuration 1 |
| | | Total thickness [μm] (Note 1) | 60.1 | 70 | 70 |
| | First elastomer layer | Thickness of elastomer part [μm] | 50 | 30 | 30 |
| | | 100% modulus [MPa] | 0.1 | 3.5 | 4.0 |
| | | Volume resistivity [Ω · cm] | 1.0E+14 | 4.0E+14 | 2.0E+14 |
| | | Material | Silicone | Acrylic | Urethane |
| | | Curing method | UV | | Heating |
| | Second elastomer layer | Thickness [μm] | 0.1/10 upper/lower | 20 | 20 |
| | | Tensile strength [MPa] | 8.0/8.0 | 3.2 | 6.0 |
| | | Volume resistivity [Ω · cm] | 3.0E+14 | 4.0E+10 | 2.0E+12 |
| | | Material | Silicone | Acrylic | Urethane |
| | | Curing method | UV | | Heating |
| | Conductive particles | Average particle diameter [μm] | 50 | 50 | 50 |
| | (First elastomer):(Conductive particles) (volume ratio) | | 3:1 | 1:2 | 6:1 |
| Cell evaluation | Pressure application current carrying property | Electric resistance [Ω] at load of 0.01N | O.R. | O.R. | O.R. |
| | | Electric resistance [Ω] at load of 0.25N | 0.5 | 1.7 | 1.1 |
| | | Electric resistance [Ω] at load of 0.5N | 0.5 | 1.3 | 0.9 |
| | | Electric resistance [Ω] at load of 3N | 0.2 | 0.8 | 0.4 |
| | | Electric resistance [Ω] at load of 5N | 0.4 | 0.5 | 0.4 |
| | Self-restorability | Maximum load 0.25N | ⊙ | ⊙ | ⊙ |
| | | Maximum load 0.5N | ⊙ | ⊙ | ⊙ |
| | | Maximum load 3N | ⊙ | ⊙ | ⊙ |
| | | Maximum load 5N | ⊙ | ⊙ | ⊙ |
| | Insulation performance in case of accidental ingestion (discolorment of ham in normal saline) | | Discolored quite slightly | Discolored quite slightly | Discolored quite slightly |

TABLE 1-continued

|  |  |  | Comparative Example 1 | Comparative Example 2 | Comparative Example 3 |
|---|---|---|---|---|---|
| Pressure-sensitive conductive film | Entire | Embodiment | QTCC (Note 2) | QTCC (Note 2) |  |
|  |  | Total thickness [μm] (Note 1) | 300 | 300 |  |
|  | First elastomer layer | Thickness of elastomer part [μm] |  |  |  |
|  |  | 100% modulus [MPa] |  |  |  |
|  |  | Volume resistivity [Ω · cm] | 1.0E+14 | 1.0E+14 |  |
|  |  | Material | Silicone | Silicone |  |
|  |  | Curing method | Heating | Heating |  |
|  | Second elastomer layer | Thickness [μm] |  |  |  |
|  |  | Tensile strength [MPa] |  |  |  |
|  |  | Volume resistivity [Ω · cm] |  |  |  |
|  |  | Material |  |  |  |
|  |  | Curing method |  |  |  |
|  | Conductive particles | Average particle diameter [μm] | 3 | 3 |  |
|  | (First elastomer):(Conductive particles) (volume ratio) |  | 4:1 | 7:3 |  |
| Cell evaluation | Pressure application current carrying property | Electric resistance [Ω] at load of 0.01N | O.R. | O.R. |  |
|  |  | Electric resistance [Ω] at load of 0.25N | 250 | 62 |  |
|  |  | Electric resistance [Ω] at load of 0.5N | 75 | 5.3 |  |
|  |  | Electric resistance [Ω] at load of 3N | 1.7 | 0.3 |  |
|  |  | Electric resistance [Ω] at load of 5N | 0.4 | 0.1 |  |
|  | Self-restorability | Maximum load 0.25N | X | X |  |
|  |  | Maximum load 0.5N | X | X |  |
|  |  | Maximum load 3N | Δ | ○ |  |
|  |  | Maximum load 5N | ○ | ○ |  |
|  | Insulation performance in case of accidental ingestion (discolorment of ham in normal saline) |  | Not discolored | Not discolored | Considerably discolored |

Note 1:
Sum of average particle diameter of conductive particles and thickness of second elastomer layer
Note 2:
Quantum Tunneling Composite Coating As shown in Table 1, the coin-shaped cell of Comparative Example 1 with the conductive particles not disposed in the single layer in the elastomer layer, had the large resistance at the small applied pressure even under the pressure application generating the current supply state. That is, the coin-shaped cell was not able to quickly achieve the current supply state at the low resistance under the pressure application at the threshold or more, and the cell resistance due to the applied pressure easily varied in the current supply state.

In contrast to this, it has been found that all of the coin-shaped cells in Examples 1 to 9 can maintain the insulation state at 0.01 N, and can quickly achieve the current supply state at the low resistance at the load of 0.25 N. Moreover, the coin-shaped cells of Example 1 to 9 were able to keep safety in case of accidental ingestion and had excellent self-restorability.

The present invention has been described as related to the present embodiments. It is our intention that the invention should not be limited by any of the details of the description unless otherwise specified, but rather be construed broadly within its spirit and scope as set out in the attached claims.

INDUSTRIAL APPLICABILITY

The coin-shaped cell according to the present invention can be used for various devices and has a large industrial value.

DESCRIPTION OF SYMBOLS

1 Battery cell case
1a Bottom plate
1b Side portion
2 Positive electrode
3 Negative electrode
4 Separator
5 Gasket
6 Sealing plate
6a Top plate
6b Rim portion
7 Pressure-sensitive conductive film
8 Insulating coating
9 First elastomer layer
10 Second elastomer layer
11 Conductive particle
12 Pressure-sensitive conductive film
13 Conductive base material (Battery cell case or Sealing plate of coin-shaped cell)

The invention claimed is:
1. A coin-shaped cell, comprising:
a battery cell case having a bottom plate and a side portion rising from a rim of the bottom plate;
a sealing plate having a top plate and a rim portion extending from the top plate to the inside of the side portion;

a gasket compressed and interposed between the side portion and the rim portion;

power generation elements sealed by the battery cell case, the sealing plate, and the gasket; and a pressure-sensitive conductive film disposed on an outer surface of at least one of the battery cell case and the sealing plate;

wherein the pressure-sensitive conductive film includes:

a first elastomer layer that holds conductive particles, and a second elastomer layer which is disposed on at least one surface of the first elastomer layer and is in contact with at least a part of the conductive particles among the conductive particles held to the first elastomer layer, and wherein an average particle diameter of the conductive particles is equal to or larger than a thickness of an elastomer part of the first elastomer layer, and the conductive particles are disposed in a single layer in a planar direction of the first elastomer layer.

2. The coin-shaped cell according to claim 1, wherein the average particle diameter of the conductive particles is larger than the thickness of the elastomer part of the first elastomer layer.

3. The coin-shaped cell according to claim 1, wherein the second elastomer layer is disposed on an outer surface of at least one of the battery cell case and the sealing plate.

4. The coin-shaped cell according to claim 1, wherein the conductive particles in contact with the second elastomer layer extrude with respect to the elastomer part of the first elastomer layer heading for a side opposite to the second elastomer layer.

* * * * *